United States Patent
Berlingerio et al.

(10) Patent No.: US 9,829,334 B2
(45) Date of Patent: *Nov. 28, 2017

(54) HEDGING RISK IN JOURNEY PLANNING

(75) Inventors: Michele Berlingerio, Noicattaro (IT); Adi I. Botea, Dublin (IE); Eric P. Bouillet, Englewood, NJ (US); Francesco Calabrese, Dublin (IE); Lea A. Deleris, Dublin (IE); Donna L. Gresh, Cortlandt Manor, NY (US); Olivier Verscheure, Hopewell Junction, NJ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 152 days.

This patent is subject to a terminal disclaimer.

(21) Appl. No.: 13/617,065

(22) Filed: Sep. 14, 2012

(65) Prior Publication Data

US 2014/0067251 A1 Mar. 6, 2014

Related U.S. Application Data

(63) Continuation of application No. 13/600,996, filed on Aug. 31, 2012.

(51) Int. Cl.
*G01C 21/00* (2006.01)
*G01C 21/36* (2006.01)
(Continued)

(52) U.S. Cl.
CPC .......... *G01C 21/36* (2013.01); *G01C 21/343* (2013.01); *G01C 21/3423* (2013.01); *G01C 21/26* (2013.01); *G08G 7/00* (2013.01)

(58) Field of Classification Search
CPC ........ G01C 21/00; G01C 21/34; G01C 21/32; G01C 21/3469; G06F 3/0484
(Continued)

(56) References Cited

U.S. PATENT DOCUMENTS

| | | | | | |
|---|---|---|---|---|---|
| 5,400,020 A | * | 3/1995 | Jones | ...................... | G08G 1/123 340/992 |
| 5,948,040 A | * | 9/1999 | DeLorme | ............... | G01C 21/36 340/990 |

(Continued)

FOREIGN PATENT DOCUMENTS

| CN | 101123515 B | 6/2010 |
|---|---|---|
| CN | 101388143 B | 4/2011 |

(Continued)

OTHER PUBLICATIONS

Ackerman, et al., "Single-Bit Correct, Double-Bit Detect Error Checking/Correction Scheme"; http://www.ip/com/pubview/IPCOM000112383D; Mar. 27, 2005.

(Continued)

*Primary Examiner* — Shardul Patel
(74) *Attorney, Agent, or Firm* — Cantor Colburn LLP; Kurt Goudy (57) ABSTRACT

Embodiments of the disclosure include a method for journey planning including receiving a journey planning request, the journey planning request having an origin and a destination in a transportation network. The method also includes calculating an optimized journey plan by identifying a plurality of routes through the transportation network from the origin to the destination and determining an uncertainty associated with each of the plurality of routes. Calculating an optimized journey plan also includes evaluating a robustness of each of the plurality of routes to the uncertainty associated with each of the plurality of routes and selecting the optimized journey plan based on the journey planning request and the robustness of each of the plurality of routes.

7 Claims, 4 Drawing Sheets

(51) Int. Cl.
*G01C 21/34* (2006.01)
*G08G 7/00* (2006.01)
*G01C 21/26* (2006.01)

(58) Field of Classification Search
USPC .................. 701/400, 410, 426, 533; 342/463
See application file for complete search history.

(56) References Cited

U.S. PATENT DOCUMENTS

| | | | |
|---|---|---|---|
| 6,006,159 A | 12/1999 | Schmier et al. | |
| 6,580,998 B2 | 6/2003 | Flynn et al. | |
| 6,734,823 B2* | 5/2004 | Mintz | G01S 5/0027 342/387 |
| 7,324,893 B2 | 1/2008 | Yamashita et al. | |
| 7,603,281 B1 | 10/2009 | Miller et al. | |
| 7,914,100 B2* | 3/2011 | Kashimoto | B41J 13/0009 271/265.01 |
| 8,050,949 B2* | 11/2011 | Purang | G01C 21/343 705/5 |
| 8,284,076 B1 | 10/2012 | Horstemeyer | |
| 2002/0002548 A1* | 1/2002 | Roundtree | G06F 17/30014 |
| 2003/0055666 A1 | 3/2003 | Roddy et al. | |
| 2003/0135304 A1* | 7/2003 | Sroub et al. | 701/1 |
| 2003/0171939 A1 | 9/2003 | Yagesh et al. | |
| 2004/0199415 A1* | 10/2004 | Ho | G06Q 10/02 705/7.12 |
| 2004/0243430 A1 | 12/2004 | Horstemeyer | |
| 2005/0164673 A1 | 7/2005 | Ehlers | |
| 2006/0046732 A1 | 3/2006 | Grossman et al. | |
| 2006/0155465 A1 | 7/2006 | Jung et al. | |
| 2006/0178949 A1 | 8/2006 | McGrath | |
| 2006/0212187 A1* | 9/2006 | Wills | B61L 27/0016 701/19 |
| 2006/0224426 A1 | 10/2006 | Goossens et al. | |
| 2007/0052586 A1 | 3/2007 | Horstemeyer | |
| 2008/0014908 A1 | 1/2008 | Vasant | |
| 2008/0071466 A1* | 3/2008 | Downs et al. | 701/117 |
| 2008/0158016 A1 | 7/2008 | Wang et al. | |
| 2008/0275643 A1 | 11/2008 | Yaqub et al. | |
| 2009/0005963 A1 | 1/2009 | Jarvinen | |
| 2009/0030715 A1* | 1/2009 | Robb | G01C 21/3423 705/5 |
| 2009/0157298 A1 | 6/2009 | Kon et al. | |
| 2010/0121563 A1 | 5/2010 | Chavez et al. | |
| 2010/0145609 A1* | 6/2010 | Boss et al. | 701/202 |
| 2010/0205021 A1 | 8/2010 | Jewett et al. | |
| 2010/0268447 A1* | 10/2010 | Griffiths | G01C 21/3423 701/532 |
| 2010/0280750 A1 | 11/2010 | Chen et al. | |
| 2011/0082636 A1* | 4/2011 | Barker et al. | 701/118 |
| 2011/0112759 A1* | 5/2011 | Bast et al. | 701/202 |
| 2011/0246246 A1* | 10/2011 | Johnson | 705/5 |
| 2011/0301840 A1 | 12/2011 | Wang | |
| 2012/0010803 A1 | 1/2012 | Min et al. | |
| 2012/0041675 A1 | 2/2012 | Juliver et al. | |
| 2012/0053830 A1 | 3/2012 | Bach | |
| 2012/0059578 A1* | 3/2012 | Venkatraman | 701/411 |
| 2012/0066251 A1 | 3/2012 | Gontmakher et al. | |
| 2012/0136561 A1* | 5/2012 | Barker et al. | 701/118 |
| 2012/0226434 A1 | 9/2012 | Chiu | |
| 2012/0253867 A1 | 10/2012 | Davidson | |
| 2012/0290182 A1* | 11/2012 | Cooper | B61L 27/0027 701/70 |
| 2013/0046456 A1* | 2/2013 | Scofield | G01C 21/3423 701/117 |
| 2013/0060468 A1 | 3/2013 | Delling et al. | |
| 2013/0073195 A1 | 3/2013 | Nesbitt et al. | |
| 2013/0096827 A1 | 4/2013 | McCall et al. | |
| 2013/0144517 A1 | 6/2013 | Kickbusch | |
| 2013/0151111 A1 | 6/2013 | Skelton | |
| 2013/0204525 A1* | 8/2013 | Pfeifle | G08G 1/09626 701/533 |
| 2013/0214940 A1 | 8/2013 | Sako et al. | |
| 2013/0261956 A1* | 10/2013 | Marks | 701/425 |
| 2013/0265154 A1 | 10/2013 | Tumayan et al. | |
| 2013/0304347 A1 | 11/2013 | Davidson | |
| 2013/0325315 A1* | 12/2013 | Beaurepaire | G01C 21/3423 701/400 |
| 2014/0012498 A1 | 1/2014 | Gustafson et al. | |
| 2014/0012634 A1 | 1/2014 | Pearlman et al. | |
| 2014/0058674 A1* | 2/2014 | Shekhar | G01C 21/3446 701/533 |

FOREIGN PATENT DOCUMENTS

| | | |
|---|---|---|
| JP | 2001222796 A | 8/2001 |
| WO | 2008060308 A2 | 5/2008 |
| WO | 2011016901 A1 | 2/2011 |
| WO | WO2011016902 A1 | 2/2011 |

OTHER PUBLICATIONS

Damodaram, et al; "Error Detection and Correction Options for Data Services in B-ISDN"; GLOBECOM '90: IEEE Global Telecommunications Conference and Exhibition; Commuications: Connection to the Future:; pp. 1751-1757; vol. 3; IEEE; 1990.

Kerrigan, et al.; "Error Correction Procedure to Correct One Hard and One Soft Error Using a Single Error Correcting Code"; htpp:/www.ip.com/pubview/IPCOM000047387D; Feb. 7, 2005.

Litwin, et al; "Error Control Coding"; IEEE Potentials, vol. 20, No. 1, pp. 26-28, Feb.-Mar. 2001.

* cited by examiner

HEDGING RISK IN JOURNEY PLANNING

CROSS-REFERENCE TO RELATED APPLICATION

The present application is a continuation of and claims priority from U.S. patent application Ser. No. 13/600,996 filed on Aug. 31, 2012 the entire contents of which are incorporated herein by reference.

BACKGROUND

The present invention relates to journey planning in a transportation system, and more specifically, to hedging risk during journey planning in a transportation system.

In today's transportation systems, especially in multi-modal transportation systems, planning a journey from one location to another has become an increasingly complex problem. A journey plan is a planned route through a transportation network and may include one or more forms of transportation and one or more stops. Often, journey plans are carried out in environments characterized by uncertainty and dynamic changes. For example, in a multi-modal transportation system the arrival and departure times of planes, busses and trains can vary depending on a wide variety of factors.

As a result, journey plans can fail during execution because of factors such as unexpected changes in the transportation network. For example, a bus or train being delayed or out of service. Currently available journey planning systems provide for computing of contingent journey plans, which are journey plans with multiple possible execution branches that attempt to take into account the likelihood that a connection between two journey segments, such as flight legs, is going to be missed. However, current systems do not take into account the robustness of a journey plan to the uncertainty in the transportation network when calculating journey plans. As a result, users may unknowingly choose a journey plan that is more likely to fail or a journey plan that can result in more serious delay than other candidate journey plans.

SUMMARY

Embodiments include a method for journey planning, the method includes receiving a journey planning request, the journey planning request having an origin and a destination in a transportation network. The method also includes calculating an optimized journey plan by identifying a plurality of routes through the transportation network from the origin to the destination and determining an uncertainty associated with each of the plurality of routes. Calculating an optimized journey plan also includes evaluating a robustness of each of the plurality of routes to the uncertainty associated with each of the plurality of routes and selecting the optimized journey plan based on the journey planning request and the robustness of each of the plurality of routes.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, a method for journey planning includes hedging against risk caused by the uncertainty in a transportation system. In exemplary embodiments, the journey planning method identifies a plurality of journey plans through the transportation network and selects a journey plan for execution that is robust to uncertainty in the transportation network.

Figure 1:
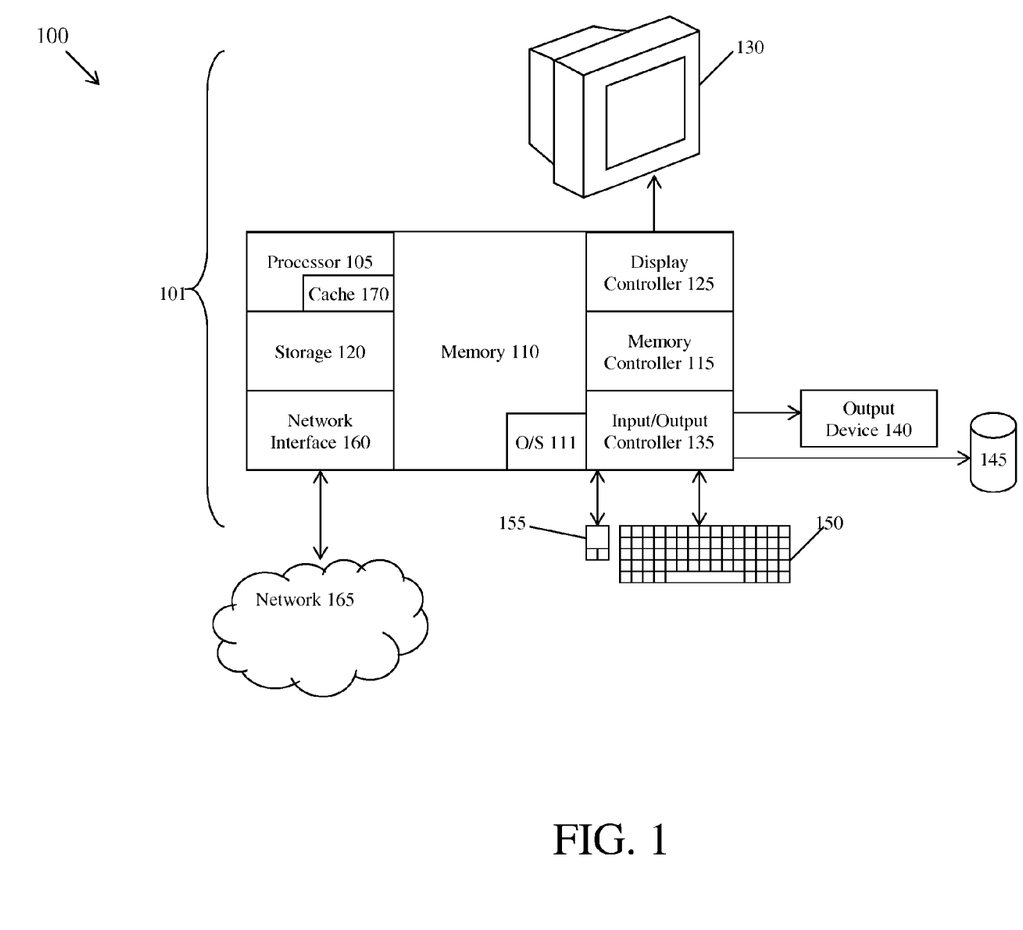
FIG. 1 illustrates a block diagram of a computer system for use in practicing the teachings herein.

FIG. 1 illustrates a block diagram of a computer system 100 for use in practicing the teachings herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. The computer system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated. When the computer 101 is in operation, the processor 105 is configured to execute instructions stored within the memory 110, to communicate data to and from the memory 110, and to generally control operations of the computer 101 pursuant to the instructions.

Figure 2:
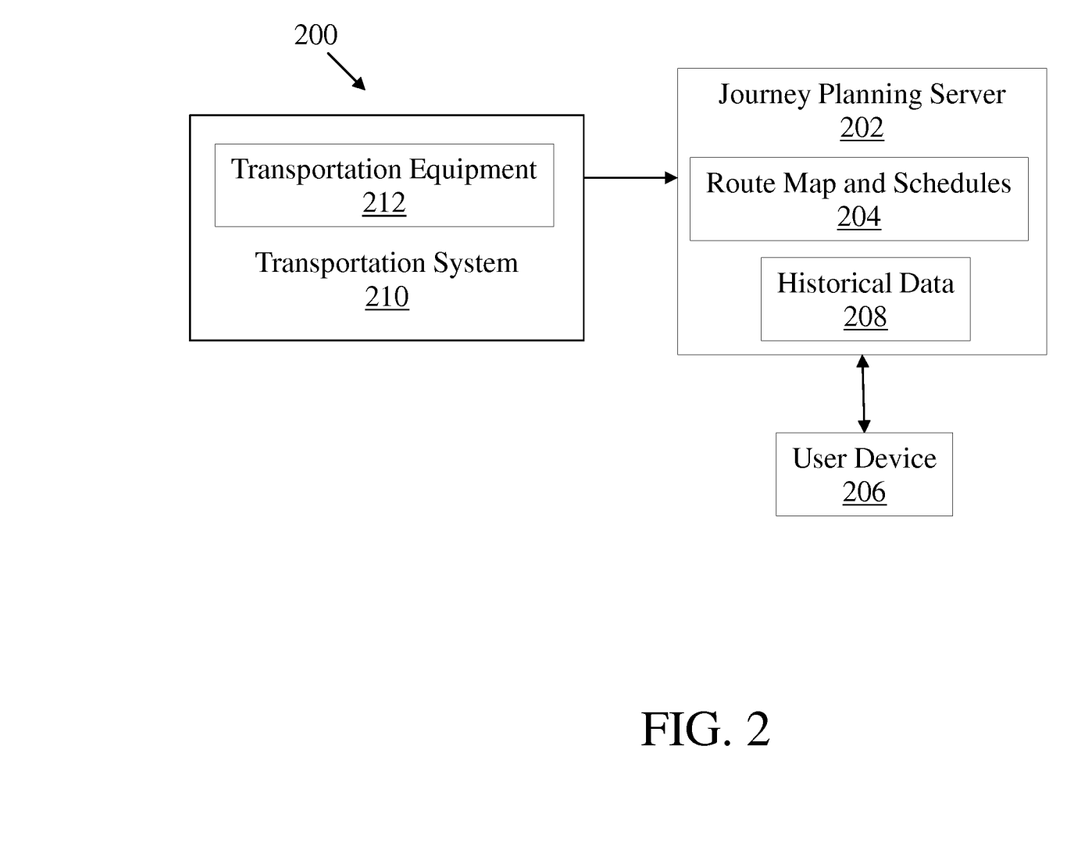
FIG. 2 illustrates a block diagram of a system for journey planning including risk hedging in accordance with an embodiment.

Referring now to FIG. 2, a block diagram of a system 200 for journey planning including risk hedging in accordance with an embodiment is shown. As illustrated the system 200 includes a journey planning server 202, a user device 206, and transportation system 210. In exemplary embodiment the transportation system 210 may be a multi-modal transportation system that includes multiple pieces of transportation equipment 212. The transportation equipment 212 may include, but is not limited to, a bus, a train, a ferry, a subway car, or the like. In exemplary embodiments, the journey planning server 202 may be a computer similar to the one shown and described in FIG. 1. The system 200 also includes one or more user devices 206 that are configured to request journey plans from the journey planning server 202. The user device 206 may include, but is not limited to, a cellular phone, a tablet device, a laptop computer, or the like.

In exemplary embodiments, the journey planning server 202 is configured to receive and store information from the transportation system 210 regarding the state of the transportation system 210. For example, the transportation system 210 may be configured to periodically update the journey planning server 202 with the information. In one embodiment, the transportation system 210 may be configured to alert the journey planning server 202 upon the detection that a piece of transportation equipment 212 is off schedule, out of service, or the like. In exemplary embodiments, the journey planning server 202 includes route map and schedules 204 that correspond to the transportation system 210. In exemplary embodiments, the journey planning server 202 also includes historical data 208 regarding the transportation equipment 212 in the transportation system 210. For example, the historical data 208 may include the scheduled and actual arrival and departure times for each piece of transportation equipment 212 in the transportation network 210. The journey planning server 202 is configured to use the route map and schedules 204 and the historical data 208 to calculate an optimized journey plan in response to a journey plan request from a user device 206.

In exemplary embodiments, a user, via the user device 206, requests a journey plan from the journey planning server 202. The journey plan includes an origin and a destination and may include additional information such as route preferences, intermediate stops, or the like. In exemplary embodiments, the journey plan request may also include one or more optimization requests, such as fastest route, least expensive route, most direct route, a worst case arrival time, or the like. Upon receiving a journey plan request from a user device 206, the journey planning server 202 calculates an optimized journey plan based on the request, the route map and schedule 204, and optionally the historical data 208. In exemplary embodiments, the optimized journey plan based on historical data 208, simulated data, informed guesses, and the like. In exemplary embodiments, the optimized journey plan is selected to be robust to the uncertainty in the transportation system 210. The optimized journey plan may then be sent to the user device 206.

In exemplary embodiments, the journey planning server 202 is configured to consider the risk of delays during journey planning to calculate journey plans that are robust to uncertainty in the transportation system 210. In one embodiment, the journey planning server 202 considers one or more contingent journey plans to determine the robustness of a journey plan to uncertainty in the transportation system 210. In general, contingent journey plans allow the inclusion of more than one execution branch in a journey plan. By considering contingency journey plans when calculating an optimized journey plan, the robustness of a journey plan to uncertainty in the transportation system 210 can be evaluated prior to execution. Accordingly, the robustness of the journey plan can be considered as a quality criterion when selecting a journey plan for execution.

The benefits of contingent journey planning are easily demonstrated in multi-modal transportation systems. In a multi-modal transportation system being late to an intermediate location along the planned route can lead to missing the next connection causing a significant impact on the remaining part of the itinerary.

Figure 3:
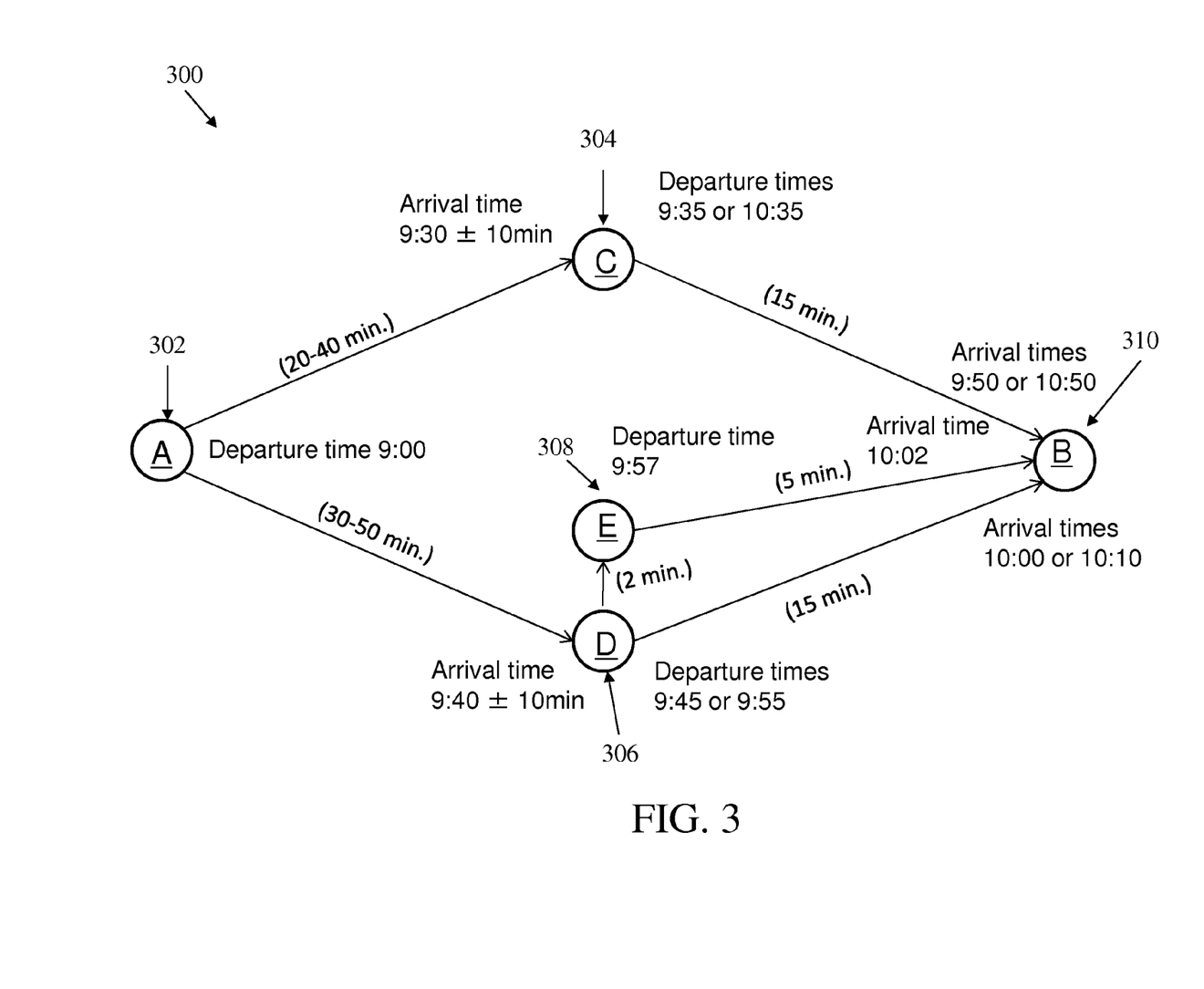
FIG. 3 illustrates a block diagram of a transportation system in accordance with an embodiment.

Referring now to FIG. 3, a block diagram illustrating a transportation system 300 is shown. The transportation system 300 includes a node A 302, node C 304, node D 306, node E 308 and node B 310. As illustrated the travel time from node A 302 to node C 304 is uncertain and ranges from twenty to forty minutes. Likewise, the travel time from node A 302 to node D 306 is uncertain and ranges from thirty to fifty minutes. The remaining travel times are not uncertain and the travel time from node C 304 to node B 310 is fifteen minutes; the travel time from node D 304 to node B 310 is fifteen minutes; and the travel time from node C 304 to node E 308 is two minutes; and the travel time from node E 308 to node B 310 is five minutes. The transportation service from node C 304 to node B 310 is an hourly service while the transportation service from node D 306 to node B 310 runs every ten minutes.

Continuing with reference to FIG. 3, assume a passenger left node A 302 destined for node B 310. If the passenger went through node C 304, the passenger's arrival time at node B 310 would be largely impacted by the amount of time the passenger had to wait at node C 304 for the hourly service from node C 304 to node B 310. In a worst case scenario, the passenger would arrive at node C 304 at the exact time the service from node C 304 to node B 310 departed, forcing the passenger to wait an entire hour at node C 304. Accordingly, the worst case travel time along the route through node C 304 would be one hour and fifty five minutes that includes forty minutes to get from node A 302 to node C 304, plus one hour waiting at node C 308, plus 15 minutes to travel from node C 304 to node B 310. Likewise, the best case travel time along that route would be thirty five minutes.

However, if the same passenger left node A 302 destined for node B 310 decided to go through node D 306, the passengers arrival time at node D 306 would not have as large of an impacted on the passengers expected arrival time at node B 310 because the transportation service from node D 306 to node B 310 runs every ten minutes and because the passenger has an available alternate route from node D 306 to node B 310. In a worst case scenario, the passenger arrives at node D 306 at the exact time the service from node D 306 to node B 310 departed, in which case the passenger could opt for the alternate route through node E 308. Accordingly, the worst case travel time along the route through node D 306 would be fifty seven minutes that includes fifty minutes to get from node A 302 to node D 306, plus two minutes to get from node D 306 to node E 308, plus 5 minutes to travel from node E 308 to node B 310. Likewise, the best case travel time along that route would be thirty seven minutes. Furthermore, if the passenger opted not to take the alternate route the worst case time would be one hour and fifteen minutes and the best case time would forty minutes.

As illustrated in the example shown and describe in FIG. 3, uncertainty in a transportation system 300 can have a large impact on the journey plan While the quickest route from node A 302 to node B 310 is through node C 304, that route has the highest level of uncertainty. Accordingly, journey planning in a transportation system including uncertainty needs to be robust to the uncertainty. In exemplary embodiments, a route, or journey plan, may include multiple contingent branches through the transportation system.

Continuing with reference to FIG. 3, assume that: a passenger wanted to leave node A 302 at 9:00 for node B 310; the hourly service from node C to 304 to node B 310 leaves at :35 after the hour; and the service from node D 306 to node B 310 departed every ten minutes on the fives (e.g., :05, :15, :25, etc.). If the user selected the route through node C 304, the overall travel time would be greatly dependent upon whether the user arrived at node C 304 in time to catch the 9:35 service, which would be determined by the uncertainty in the travel time from node A 302 to node C 304. However, if the user selected the route through node D 306, the uncertainty in the travel time from node A 302 to node D 306 would not have as large of an impact on overall travel time of the passenger.

In exemplary embodiments, the robustness of a journey plan quantifies how well the journey plan hedges risk to the uncertainty in the transportation system. In multi-model journey planning, there can be different costs involved, such as the travel time, the arrival time, the monetary cost, the walking time, the waiting time and the like. In exemplary embodiments, a journey plan can be represented by a tree of contingent pathways, rather a single sequence of actions. Given a journey plan $\pi$, let $\pi_i$, with $1 \leq i \leq N$, be all contained paths from the initial state, or origin, to a goal state, or destination. Each path $\pi_i$ can occur at execution time with probability $p_i$ assuming that $\Sigma_{i=1}^{N} p_i = 1$. $C_i$ represents the cost of the pathway $\pi_i$ (i.e., the cost, at the execution time, of following the path $\pi_s$). For instance, $C_i$ represents the travel time of taking a certain bus line. In exemplary embodiments, the cost $C_i$ may be a random variable, out of which one or more representative statistics are extracted to capture the variability of this conditional cost. These statistics are represented as $c_i$ and may include any typical measures of variability (or risk) such as expectation, mode, median, standard deviation, percentiles (including value at risk) and conditional value-at-risk (CVAR). For example, $c_i$ may be defined as the $99^{th}$ percentile of $C_i$, i.e., $c_i$ is defined by $P(t<c_i)=0.99$, where t denotes the random travel time.

Letting $\pi^*$ be the most likely path to be executed, $p^*$ its likelihood and $c^*$ its associated cost. A variety of robustness measures may be considered in determining an optimized journey plan. Often, it is important for a passenger to arrive at a destination before a certain deadline. For example, to arrive at the airport in time to catch a flight, or arrive at work before the start of an important meeting. In such cases, the journey plan robustness can be defined as:

$$m = \frac{1}{\max_{i=1:N} c_i}$$

taking into account the worst-case scenario (pathway) in the contingent plan. In exemplary embodiments, this robustness measure can be used alone, or in combination with additional robustness criteria.

For example, if two or more journey plans have the same m value, ties can be broken by preferring journey plans with a smaller expected cost (e.g., travel time, or arrival time). That is, prefer journey plans with a smaller $e=\Sigma_{i=1}^{N} P_i c_i$. Such a combination corresponds to a user's preference to be on time and to want to arrive as soon as possible. Alternatively, a user may want a journey plan that is robust to incidents, meaning that if things do not go as planned, the outcome would not be too different. For example, a user may prefer a journey plan with a most consistent arrival time which moderately increases travel time if they miss the first connection over a journey plan that has a lowest average travel time but where travel time is tripled if they miss the first connection. Such definitions of robustness quantify how much different the pathways of the journey plan are from each other in terms of the relevant cost at hand (e.g., travel time). In such situations, meaningful robustness metrics can be represented as:

$$\frac{c^*}{\max_{i=1:N} c_i}$$

or $$\frac{\sum_{i=1}^{N} p_i c_i}{\max_{i=1:N} c_i}.$$

The higher the value, i.e., the closer to 1, the more robust the journey plan is to uncertainty in the transportation system. Similarly, such criteria can be used by themselves or in combination with other robustness metrics.

Figure 4:
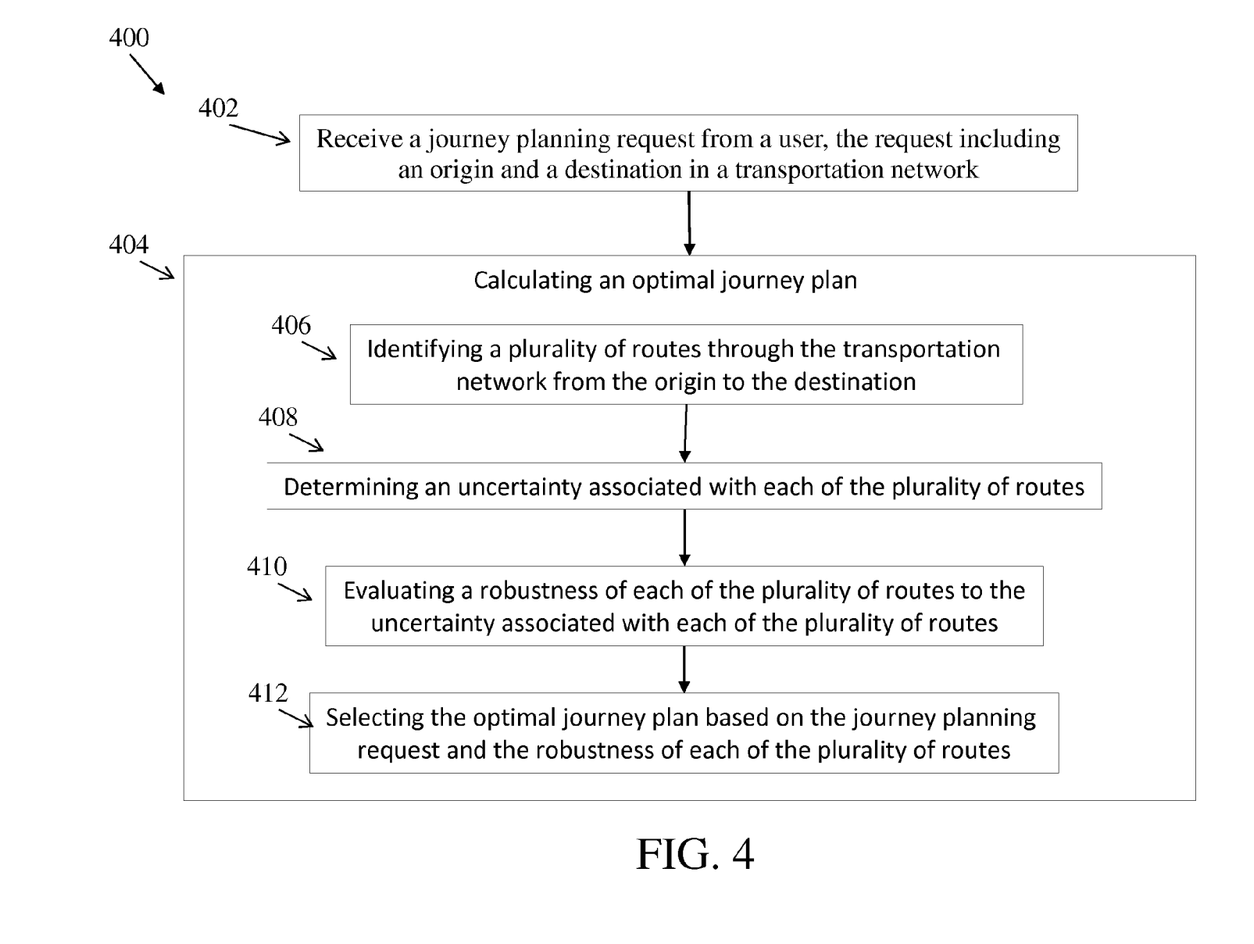
FIG. 4 illustrates a flow diagram of a method for journey planning including risk hedging in accordance with an embodiment.

Referring now to FIG. 4, a flow chart illustrating a method 400 for journey planning including risk hedging in accordance with an exemplary embodiment is shown. As shown at block 402, the method 400 includes receiving a journey planning request, the journey planning request including an origin and a destination in a transportation network. Next, as shown at block 404, the method includes calculating an optimized journey plan. Calculating the optimized journey plan includes identifying a plurality of routes through the transportation network from the origin to the destination, as shown at block 406. Next, as shown at block 408, calculating the optimized journey plan includes determining an uncertainty associated with each of the plurality of routes. As shown at block 410, a robustness of each of the plurality of routes to the uncertainty associated with each of the plurality of routes is evaluated. Finally, as shown at block 412, calculating the optimized journey plan includes selecting the optimized journey plan based on the journey planning request and the robustness of each of the plurality of routes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for journey planning through a multi-modal transportation system, the method comprising:
   receiving a journey planning request, the journey planning request comprising an origin and a destination in the multi-modal transportation network;
   receiving and storing information from the multi-modal transportation network regarding a state of one or more pieces of transportation equipment in the multi-modal transportation network, wherein the state of one or more pieces of equipment comprises at least one of on-schedule, off-schedule, and out-of-service;
   calculating, by a processor, an optimized journey plan, wherein calculating the optimized journey plan comprises:
      identifying a plurality of routes through the multi-modal transportation network from the origin to the destination;
      determining an uncertainty associated with each of the plurality of routes, wherein the uncertainty comprises a variability of a travel time along each route, wherein the variability is based on an expected travel time, a mode travel time, a median travel time and a standard deviation;
   evaluating a robustness of each of the plurality of routes to the uncertainty associated with each of the plurality of routes; and
      selecting the optimized journey plan based on the journey planning request and the robustness of each of the plurality of routes.

2. The method of claim 1, wherein the journey planning request further comprises an optimization request and wherein selecting the optimized journey plan is further based on the optimization request.

3. The method of claim 2, the optimization request comprises a worst case arrival time.

4. The method of claim 2, the optimization request comprises a most consistent arrival time.

5. The method of claim 1, wherein determining an uncertainty associated with each of the plurality of routes is based on a historical data associated with the multi-modal transportation network.

6. The method of claim 1, wherein evaluating a robustness of each of the plurality of routes to the uncertainty associated with each of the plurality of routes includes determining a worst case travel time for each of the plurality of routes and an expected travel time for each of the plurality of routes.

7. The method of claim 1, wherein at least one of the plurality of routes through the multi-modal transportation network from the origin to the destination includes multiple contingent branches.

* * * * *